United States Patent [19]
Wallen, Sr.

[11] 3,779,175
[45] Dec. 18, 1973

[54] PORTABLE LOCOMOTIVE CAB STORM WINDOW

[75] Inventor: Raymond Allen Wallen, Sr., Spokane, Wash.

[73] Assignee: The Raymond Lee Organization, Inc., New York, N.Y.

[22] Filed: Aug. 18, 1972

[21] Appl. No.: 281,737

[52] U.S. Cl. .................. 105/456, 52/202, 105/353, 160/127, 296/78 R, 296/84 C
[51] Int. Cl. ... B61c 17/04, B61d 25/00, B61k 13/00
[58] Field of Search ..................... 52/202; 105/353, 105/456; 160/127; 296/78 R, 84 C

[56] References Cited
UNITED STATES PATENTS

| | | | |
|---|---|---|---|
| 586,896 | 7/1897 | Carroll | 105/456 X |
| 2,311,550 | 2/1943 | Kauffman | 110/127 |
| 2,345,703 | 4/1944 | Goebel | 105/456 X |
| 2,437,062 | 3/1948 | Wyble | 105/456 X |

*Primary Examiner*—Gerald M. Forlenza
*Assistant Examiner*—Howard Beltram
*Attorney*—Daniel Jay Tick

[57] ABSTRACT

A portable storm window for a window of a locomotive cab comprises a glass panelled box with an adjustable rear view mirror having an open side and dimensioned to fit into the maximum open area of the cab window when the cab window is open. The box extends outward beyond the outside of the locomotive at the cab window. A protruding strip around the open side of the box is adapted to abut the inside of the locomotive at the cab window. Releasable fastening means on the strip releasably affixes the storm window to the inside of the locomotive at the cab window.

7 Claims, 2 Drawing Figures

PATENTED DEC 18 1973

3,779,175

PORTABLE LOCOMOTIVE CAB STORM WINDOW

DESCRIPTION OF THE INVENTION

The present invention relates to a portable storm window. More particularly, the invention relates to a portable storm window for a locomotive cab.

An object of the invention is to provide a portable storm window for a locomotive cab which is very inexpensive to manufacture, fits a number of locomotive windows and may be installed and removed with facility, rapidity and convenience.

Another object of the invention is to provide a portable storm window which is of light weight, highly portable and may be switched from one window to another in a locomotive cab.

Still another object of the invention is to provide a portable storm window for a locomotive cab which may be cleaned on its inside and outside surfaces while it is in the cab.

Yet another object of the invention is to provide a portable storm window for a locomotive cab which is wind, snow and rain tight and operates efficiently and effectively.

Another object of the invention is to provide a portable storm window for a locomotive cab which is structurally strong and rigid, and fits snugly and tightly in the frame of the cab window.

Another object of the invention is to provide a portable storm window for a locomotive cab which has a rear view mirror mounted therein.

Figure 1:
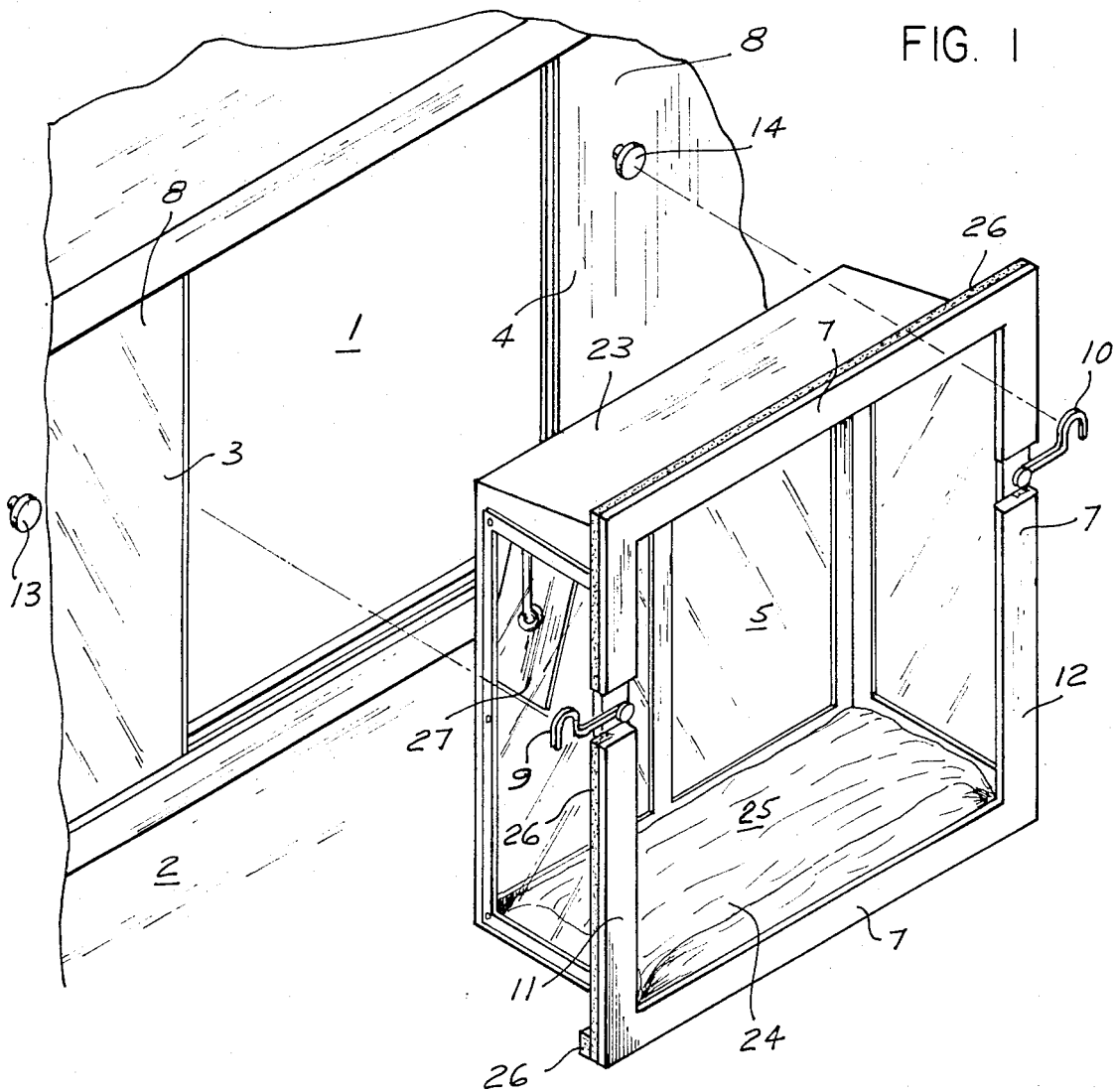
Figure 2:
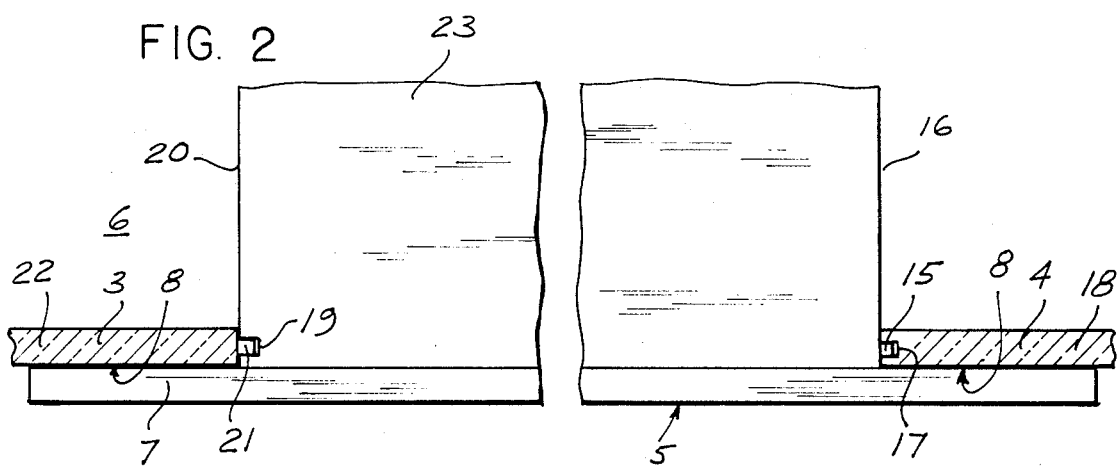

In order that the invention may be readily carried into effect, it will now be described with reference to the accompanying drawing, wherein:

FIG. 1 is a schematic diagram of an embodiment of the portable storm window; and FIG. 2 is a top view of the embodiment of FIG. 1.

In the FIGS., the same components are identified by the same reference numerals.

The portable storm window of the invention is for a window 1 of a locomotive cab 2 (FIG. 1). The cab window 1 has slidable glass panels 3 and 4 (FIGS. 1 and 2) therein.

The storm window comprises a glass panelled box having an open side 5 (FIGS. 1 and 2) and dimensioned to fit into the maximum open area of the cab window 1 when said cab window is open. The storm window extends outward beyond the outside 6 (FIG. 2) of the locomotive at the cab window 1, as shown in FIG. 2.

The storm window further comprises a protruding strip 7 (FIGS. 1 and 2) around the open side 5 of the box. The protruding strip 7 is adapted to abut the inside 8 (FIGS. 1 and 2) of the locomotive 2 at the cab window 1.

A releasable fastening device (FIG. 1) is affixed to the protruding strip 7 for releasably affixing the storm window to the inside 8 of the cab window 1. The fastening device comprises two hooks 9 and 10 affixed to opposite sides 11 and 12 of the protruding strip 7 (FIG. 1). The hooks 9 and 10 are adapted to engage corresponding members 13 and 14, respectively, on the inside 8 of the locomotive 2 at the cab window 1. The members 13 and 14 are shown as posts or pins, although they may be eyes.

The box has a projecting strip 15 (FIG. 2) extending from one side 16 thereof adapted to fit into a corresponding groove 17 formed in a glass panel 18 (FIG. 2) of the cab window 1. The box has a groove 19 formed in an opposite side 20 (FIG. 2) thereof adapted to accommodate a corresponding projecting strip 21 (FIG. 2) of another glass panel 22 (FIG. 2) of the cab window 1.

The box has a top 23 (FIGS. 1 and 2) sloping downward from the protruding strip 7 to provide drainage. The box has a bottom 24 (FIG. 1) and padding 25 on the inside of the box on the bottom to accommodate an arm of a person leaning in the storm window.

Weather stripping 26 (FIG. 1) is provided on the surface of the protruding strip 7 adapted to abut the inside 8 of the locomotive 2.

A rear view mirror 27 (FIG. 1) is adjustably mounted in the box.

While the invention has been described by means of specific examples and in specific embodiments, I do not wish to be limited thereto, for obvious modifications will occur to those skilled in the art without departing from the spirit and scope of the invention.

I claim:

1. A portable storm window for a window of a locomotive cab having slidable glass panels therein, said storm window comprising a glass panelled box having an open side and dimensioned to fit into the maximum open area of the cab window when said cab window is open and extending outward beyond the outside of the locomotive at said cab window, said storm window further comprising a protruding strip around the open side of the box adapted to abut the inside of the locomotive at said cab window and releasable fastening means on the strip for releasably affixing the storm window to the inside of the locomotive at the cab window.

2. A portable storm window as claimed in claim 1, wherein the box has a projecting strip extending from one side thereof adapted to fit into a corresponding groove formed in a glass panel of the cab window and a groove formed in an opposite side thereof adapted to accommodate a corresponding projecting strip of another glass panel of the cab window.

3. A portable storm window as claimed in claim 2, wherein the fastening means comprises hooks affixed to opposite sides of the protruding strip adapted to engage corresponding members on the inside of the locomotive at the cab window.

4. A portable storm window as claimed in claim 2, further comprising a rear view mirror adjustably mounted in the box.

5. A portable storm window as claimed in claim 2, wherein the box has a top sloping downward from the protruding strip to provide drainage.

6. A portable storm window as claimed in claim 5, wherein the box has a bottom and padding on the inside of the box on the bottom to accommodate an arm of a person leaning on the storm window.

7. A portable storm window as claimed in claim 6, further comprising weather stripping on the surface of the protruding strip adapted to abut the inside of the locomotive.

* * * * *